United States Patent
Maxwell

[11] 3,820,824
[45] June 28, 1974

[54] DICTIONARY INDEX

[76] Inventor: James F. Maxwell, 3507 Lakewood Dr., Norfolk, Va. 23509

[22] Filed: July 30, 1973

[21] Appl. No.: 383,468

Related U.S. Application Data

[63] Continuation-in-part of Ser. No. 298,373, Oct. 17, 1972, abandoned.

[52] U.S. Cl. ............................................. 283/36
[51] Int. Cl. .......................................... B42d 15/00
[58] Field of Search ............................ 283/36–42

[56] References Cited
UNITED STATES PATENTS

| | | | |
|---|---|---|---|
| 472,629 | 4/1892 | Stephenson | 283/42 |
| 472,630 | 4/1892 | Stephenson | 283/36 |
| 493,552 | 3/1893 | Laning | 283/36 |
| 494,466 | 3/1893 | Dennick | 283/41 |
| 540,050 | 5/1895 | Hall et al. | 283/41 |
| 2,195,646 | 4/1940 | Green | 283/38 |

Primary Examiner—Lawrence Charles
Attorney, Agent, or Firm—Roylance, Abrams, Berdo & Kaul

[57] ABSTRACT

An index for aiding location of a word in alphabetical sequence in a dictionary includes a table for each letter, each table having five columns. The first three columns list all combinations of first three letter groups in the sequence, the first two columns being blank except where a second letter change occurs. The fourth column gives the number of the page on which words having each three letter group commence, and the fifth column contains symbols identifying the quadrant on that page where the group commences. Also disclosed is a kit for modification of an existing book to provide it with index pages, the pages being attachable in the book as by adhesive. In a further embodiment a calibrated margin guide is used with the index, the guide having a tab for providing alignment with the top of the page and calibrations further subdividing top and bottom halves, the guide being movable laterally to serve all quadrants. The index is then provided with a sixth column having a number from 1 to 9 indicating subdivision. A fourth letter guide to be provided at the bottoms of pages is also disclosed. The fourth letters are also printed in the left margin of each column of words, in alphabetical order in front of the words representing the first ones of fourth-letter groups, and below the third letter marker in that same column.

8 Claims, 12 Drawing Figures

PATENTED JUN 28 1974

INDEX B

| 10 11 12 13 14 | | | 10 11 12 13 14 | | |
|---|---|---|---|---|---|
| B - - - | .63b | B E t | .81b | B O n | .95d |
| B A a | .63b | u | .81d | o | .96c |
| b | .63b | v | .81d | p | .97c |
| c | .63d | w | .81d | r | .97c |
| d | .65a | y | .82a | s | .98b |
| e | .65b | z | .82a | t | .98c |
| f | .65b | B H a | .82a | u | .99a |
| g | .65b | o | .82a | v | .99d |
| h | .65c | B I - | .82a | w | .99d |
| i | .65c | a | .82a | x | 100c |
| k | .65d | b | .82b | y | 100d |
| l | .66a | c | .82d | z | 100d |
| m | .67b | d | .83a | B R. a | 100d |
| n | .67b | e | .83b | e | 103a |
| o | .68c | f | .83b | i | 104c |
| p | .68c | g | .83c | o | 106a |
| r | .69a | h | .83d | u | 107d |
| s | .71b | j | .83d | y | 108b |
| t | .72c | k | .83d | B U. b | 108c |
| u | .73c | l | .84a | c | 108c |
| v | .73c | m | .84d | d | 109b |
| w | .73c | n | .85a | f | 109c |
| y | .74a | o | .85c | g | 109d |
| z | .74b | p | .86a | h | 110a |
| B B a | .74b | q | .86a | i | 110a |
| B C. g | .74b | r | .86a | l | 110a |
| o | .74b | s | .86d | m | 111a |
| s | .74b | t | .87a | n | 111b |
| B D e | .74b | v | .87d | o | 111d |
| B E - | .74b | w | .87d | r | 111d |
| a | .74b | y | .87d | s | 112d |
| b | .76b | z | .87d | t | 113c |
| c | .76b | B L a | .87d | x | 114c |
| d | .76b | e | .90a | y | 114c |
| e | .76d | i | .90c | z | 114c |
| f | .77b 15 | o | .91a | B Y. - | 114d |
| g | .77c | u | .92d | a | 114d |
| h | .77d | B Q a | .93d | b | 114d |
| i | .78a | b | .94b | e | 114d |
| j | .78a | c | .94c | g | 114d |
| l | .78a | d | .94c | l | 114d |
| m | .79b | e | .94d | n | 114d |
| n | .79b | f | .94d | p | 114d |
| o | .80c | g | .94d | r | 114d |
| p | .80c | h | .95a | s | 115a |
| q | .80c | i | .95a | t | 115a |
| r | .80c | l | .95b | w | 115c |
| s | .81a | m | .95d | z | 115c |

FIG. 1

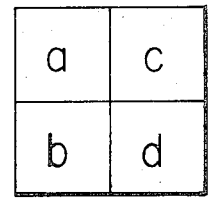

FIG. 2

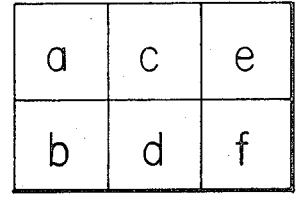

FIG. 3

20 biv·ouac \'biv-,wak, -ə-,wak\ n [F, fr. LG biwake, fr. bi at + wake guard] 1 : an encampment under little or no shelter usu. for a short time  2 : a camping out for a night; also : a temporary shelter or settlement — bivouac vi biv·ouacked; biv·ouack·ing
▶¹bi·week·ly \(')bī-'wē-klē\ adj 1 : occurring every two weeks : FORTNIGHTLY  2 : occurring twice a week — biweekly adv
²biweekly n : a biweekly publication
▶bi·year·ly \(')bī-'yi(ə)r-lē\ adj 1 : BIENNIAL  2 : BIANNUAL
¹bi·zarre \bə-'zär\ adj [F, fr. It bizzarro] : strikingly out of the ordinary: as  a : odd, extravagant, or eccentric in style or mode  b : involving sensational contrasts or incongruities  c : ATYPICAL syn see FANTASTIC — bi·zarre·ly adv — bi·zarre·ness n
²bizarre n : a flower with atypical striped marking
bi·zon·al \(')bī-'zōn-ᵊl\ adj : of or relating to the combined affairs of two administrative areas — bi·zone \'bī-,zōn\ n
▶¹blab \'blab\ n [ME blabbe; akin to ME blaberen] 1 : TATTLETALE  2 : idle or excessive talk : CHATTER — blab·by \'blab-ē\ adj
²blab vb blabbed; blab·bing vt : to reveal esp. by talking without reserve or discretion  ~ vi 1 : to reveal a secret esp. by indiscreet chatter  2 : PRATTLE
¹blab·ber \'blab-ər\ vb blab·ber·ing \'blab-(ə-)riŋ\ [ME blaberen] : BABBLE, CHATTER
²blabber n : idle talk : BABBLE
³blab·ber \'blab-ər\ n [²blab] : one that blabs
blab·ber·mouth \'blab-ər-,mau̇th\ n : one who talks too much; esp : TATTLETALE
¹black \'blak\ adj [ME blak, fr. OE blæc; akin to OHG blah black, L flagrare to burn, Gk phlegein, OE bǣl fire — more at BALD] 1 a : of the color black  b : very dark  2 a : having dark skin, hair, and eyes : SWARTHY  b : of or relating to a group or race characterized by dark pigmentation; esp : NEGROID  3 : dressed in black  4 : SOILED, DIRTY  5 a : characterized by the absence of light ⟨a ~ night⟩  b : reflecting or transmitting little or no light ⟨~ water⟩  6 a : thoroughly evil : WICKED ⟨a ~ deed⟩  b : expressive of condemnation or discredit  7 : invoking the supernatural and esp. the devil  8 a : GLOOMY, CALAMITOUS; specif : marked by the occurrence of disaster  b : SULLEN, HOSTILE  9 : COMPLETE, UTTER

FIG. 7

DICTIONARY INDEX

This application is a continuation-in-part of Ser. No. 298,373, filed Oct. 17, 1972, now abandoned.

This invention relates to index techniques, and more specifically, to a manner of indexing an alphabetically arranged document or set of documents and specifically for providing indexing means for a dictionary.

While this invention is adaptable to alphabetically arranged data of various types, it will be described with specific reference to a dictionary because the dictionary is well-known and most used body of alphabetically arranged information.

Bodies of data having identifying words, such as dictionaries, are of course well-known. In such bodies it is common practice to print the data the key words in relatively small and compact array for, among other things, minimization of the volume of the work. There are various techniques used to emphasize the key words and to render them easier to spot as one leafs through the work. Also, some indentations and the like are used in an effort to speed the process of locating the desired key word and data accompanying it.

However, such thumb indexes and the various other devices which have been used as locating aids are uniformly deficient in some ways and leave something to be desired as aids in the rapid location of the desired information.

It is an object of the present invention to provide a combination of index aids to enable the user to speedily arrive at the information he wishes to locate.

Another object is to provide an index arrangement for a book or the like in which the shape, utility and appearance of the book is not adversely altered.

Broadly described, the invention includes a plurality of multi-column tables, one for each one of selected letters of the alphabet, there normally being twenty-six such tables but larger or smaller numbers can be used depending upon the volume of the data, print size, page size, etc. Each of the tables includes five columns with the first three columns containing, in alphabetical order, the first three letters of each word in the sequence of identifying words by which the body of data is stored and retrieved. The letters need only be printed once in each of the columns until there is a change in either the second or third letter, the result being that there is no unnecessary repetition of letters in the columnar direction. The fourth column contains the number of the page on which each three-letter group begins, the number being aligned with its related three-letter group. The fifth column contains a symbol representing the location on the page of the beginning of the related group, (i.e., the change point) the symbol being aligned with its related group and page number. The symbol can conveniently identify the quadrant of the page on which the group appears.

A sixth column can also be provided for use with a separate calibrated guide which is movable with respect to the page and can indicate subdivision somewhat finer than the quadrant.

In one embodiment, the tables can be provided as an index kit for the modification of an existing book, the kit comprising a plurality of pages with means on each of the pages for fastening the page into the book adjacent a word group, the pages having the columnar tables described above.

In addition to the foregoing, indicating markers are placed adjacent each three-letter group on the pages carrying the identifying words and the information. The indicating markers each constitute a printed letter which is the third letter of the three-letter group beginning at that point on the page. A further guide can be provided by listing the fourth letters which occur on each page at the bottom of the page and along the left margins of word columns, in front of the first word in which they appear as the fourth letter.

In order that the manner in which the foregoing and other objects are attained in accordance with the invention can be understood in detail, particularly advantageous embodiments thereof will be described with reference to the accompanying drawings which form a part of the specification, and wherein:

FIG. 1 is a diagram of a typical index page according to the invention;

FIGS. 2 and 3 are diagrams showing the identification of page location symbols;

FIG. 7 is an illustration of a portion of a typical dictionary page having indicating letter markers in appropriate positions;

Figure 4:
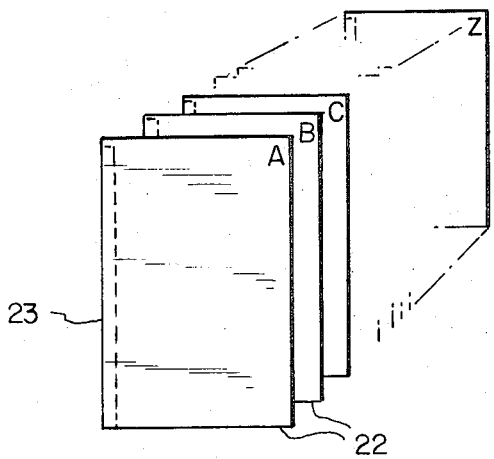
FIG. 4 is a drawing of a group of index pages constituting a modification kit.

Referring to the figures in detail, it will be seen that FIG. 1 shows a typical columnar table, the specific one shown being a table for the letter B of Webster's Seventh New Collegiate Dictionary, edition of 1970, published by the G. and C. Merriam Company of Springfield, Massachusetts. In this table there are five basic columns bearing information usable to locate the words in the dictionary very quickly. It will be noted that the five columns are broken into three column groups, for convenience based upon the selection of type size, page size and the like. Four or some other number of arrangements could just as easily be used. In the table of FIG. 1, the first column, indicated generally at 10, includes the first letter of each word in this group, B. The second column, indicated generally at 11, contains the second letter of each word in the "B" group, and the third column indicated generally at 12, contains the third letter of the words in this section of the dictionary. These columns form subsets or subgroups of the words in the dictionary section and every word beginning with B in this dictionary is represented by having its first three letters in this index.

The fourth column, indicated generally at 13, includes page numbers, each page number being adjacent the three-letter group which starts on that page. The fifth column, indicated generally at 14, includes a symbol indicative of the location on that page where the three-letter word group begins. As will be seen in FIG. 2, a typical page of the dictionary can be envisioned as being divided into four segments, or quadrants of data, a,b,c,d, the letter a representing the top half of the left-hand column on a dictionary page arranged in two columns. For an arrangement in which three columns of words per page appear, the letter shown in FIG. 3 can be used, this figure showing a typical page broken into six segments.

To permit a clear understanding of the foregoing, an example will be helpful. Consider locating the word "blabber." The entire index as shown in FIG. 1 as the first letter B, in column 10 so the next step is to examine column 11 till the second letter "L" is encountered. This is found in the three-letter group indicated generally at 15, this group also including the third letter of the word "A." Adjacent that three-letter group is the page number, 87, and the quadrant identification d. From this, one would turn to page 87 immediately and examine the lower half of the right-hand column, whereupon the left margin in quadrant (d) will be found the letter marker (a) which is the same as the third-letter of group "bla" in the book. This letter (a) acts as an eye catching marker, quickly locating the three-letter beginning "bla." From here the word "blabber" can quickly and easily be located. It will be recognized that by placing the page numbers adjacent an edge of each page farthest from the binding, e.g., the top or bottom outer corner, the location technique is greatly facilitated.

As seen in FIG. 1, the first letter B is repeated only when a new three-letter group, involving a two-letter change is encountered, i.e., only when the second letter changes. Thus, there is minimum repetition of the letters in the columnar direction.

In conjunction with the index to three-letter groups indicating letter markers are placed on the page adjacent the beginning of each three-letter group, i.e., at the three-letter change point. A portion of the D quadrant of page 87 is reproduced in FIG. 7 with emphasis marks 20 adjacent the beginnings of three letter groups. It will be observed that the third letter is desirably printed in a different kind of type, for example, to the left of the key word.

It is contemplated that the indexing technique of this invention can be employed when the dictionary or other book is first printed as previously mentioned. However, it can also be incorporated in a kit form for modification of an existing text such as the 1970 edition of the Webster's Dictionary previously mentioned.

A kit might constitute, for example, 26 individual pages such as those illustrated in FIG. 4, each page having the tabular index for one letter provided on one face thereof. Alternatively, the tabular indexes for two letters can appear on one page, either the front of the page or one letter on each face thereof, the selection and arrangement of these letters being chosen to accompany the two-letter thumb indexes which frequently are employed in conventional dictionaries.

Clearly, the pages can also be located at one point in the book. As shown in FIG. 4, each page 22 is provided with a portion along the binder edge 23 thereof designed to be fastenable to the book adjacent the binder. A suitable technique for accomplishing this is to provide a narrow strip of adhesive being of the moisture activated or of the pressure sensitive contact type.

Figure 5:
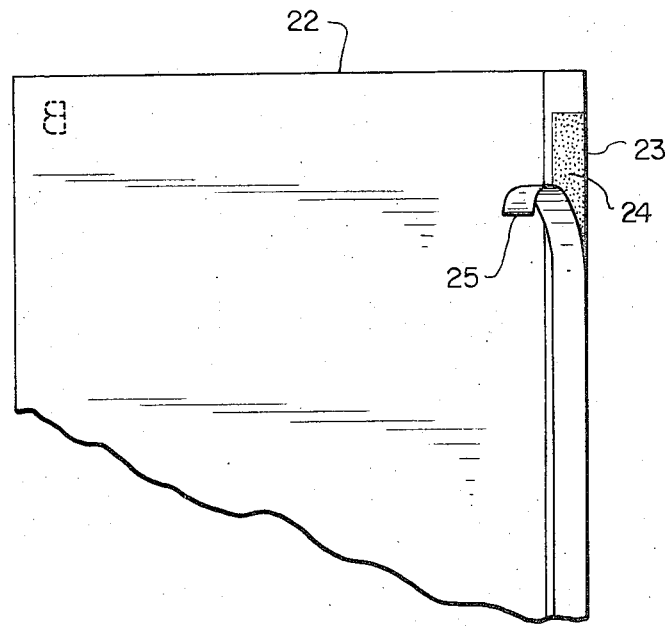
FIG. 5 is a more detailed illustration of a single page of the kit of FIG. 4.
Figure 6:
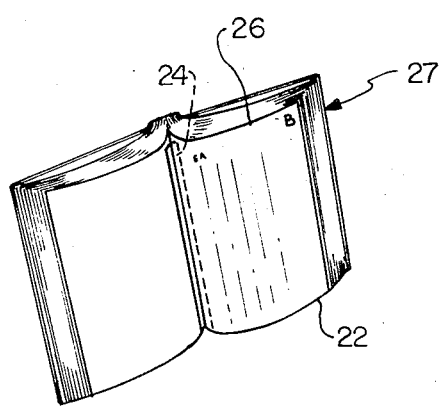
FIG. 6 is an illustration of a book having a page according to FIGS. 4 and 5 installed therein.

As shown in FIG. 5, a page 22 is provided with a layer of pressure sensitive adhesive 24 along the edge 23 which is intended to be closest to the binding of the book. A strip of paper 25 which is provided with a release agent on one surface covers the pressure sensitive adhesive until the page is to be installed at which time the release paper 25 is removed, exposing the adhesive which can then be used to attach sheet 22 into the book as shown in FIG. 6. In FIG. 6 the page 22 is installed with the adhesive strip 24 in contact with the appropriate page 26 of the book indicated generally at 27.

Figure 8:
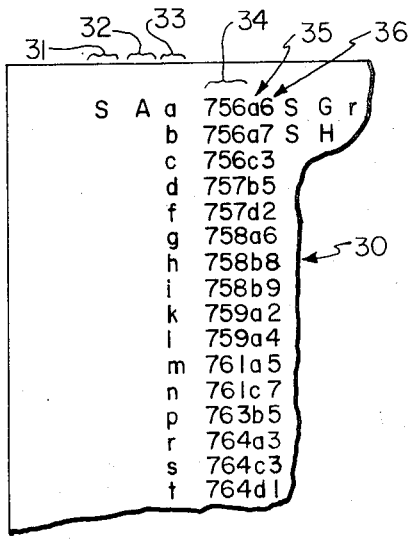
FIG. 8 is a diagram of a portion of an index page according to a further embodiment of the invention.

A further embodiment of an index in accordance with the invention is illustrated in FIG. 8, which shows a fragment 30 of a page from an index having first letter, second letter and third columns 31, 32 and 33, respectively, and also a page number column 34 and a quadrant letter column 35, substantially as previously described.

In addition, the index of FIG. 8 includes a column which includes numbers further subdividing each quadrant into, for example, ten parts. This column is used in conjunction with a margin guide as shown in FIGS. 10 and 11 and in conjunction with the dictionary page, a portion of which is illustrated at 37 in FIG. 9, this portion being that which cooperates with the fragment 30 of the index shown in FIG. 8.

As will be seen, the index fragment shows words beginning with the letter S and the last indication in the index fragment is for words beginning SAU. It will be observed that the upper right-hand corner of page 765 is the portion 37 shown in FIG. 9, this being the portion which includes the beginning of the SAU words which commence with "sauce." This type of index as shown in FIG. 8, with sixth column shown generally at 36 and having numbers 1 to 9 is used only when the index system is to be installed as a kit after a book is published and therefore this book will not contain any markers of any discription. Locating three-letter beginnings will depend entirely by use of MARGIN GUIDE as shown in FIGS. 10 and 11.

Figures 10, 11:
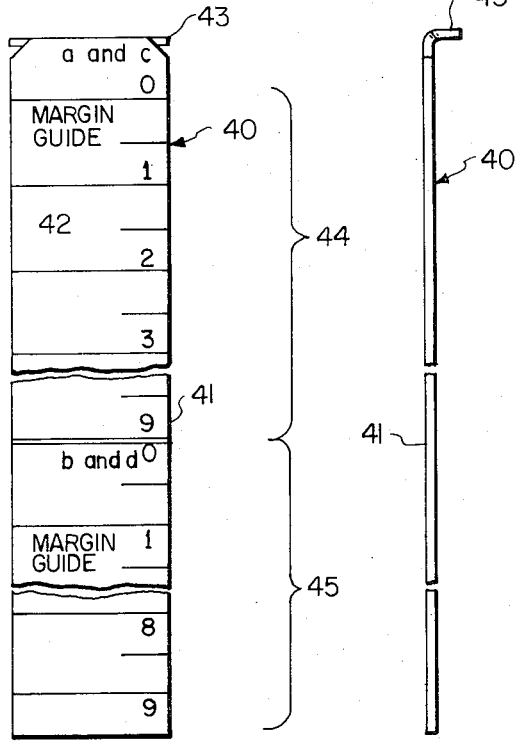
FIGS. 10 and 11 are front and side elevations, respectively, of a guide usable with the index of FIG. 8.

The margin guide 40, as illustrated in FIGS. 10 and 11, includes a main body portion 41 which is similar in general configuration to a thin plastic ruler and has inscribed on one surface thereof index mark 42 at regular intervals, alternate ones of the index marks being numbered for identification. The margin guide is relatively thin and can be made of conventional flexible plastic material and provided with the indicia either by inscribing directly upon the plastic or by adhering a printed label thereto.

It will be observed that the margin guide is divided into an upper portion 44 and a lower portion 45, each of these portions occupying half of the margin guide and indicating the upper and lower page quadrants. Thus, the upper portion of the margin guide can bear the legion "a and c" indicating that the upper portion of the guide is usable for either quadrants "a and c" and subdivides those quadrants into the numbered portions. Similarly, the lower portion 45 is usable for quadrants b and d and is so marked.

Figure 12:
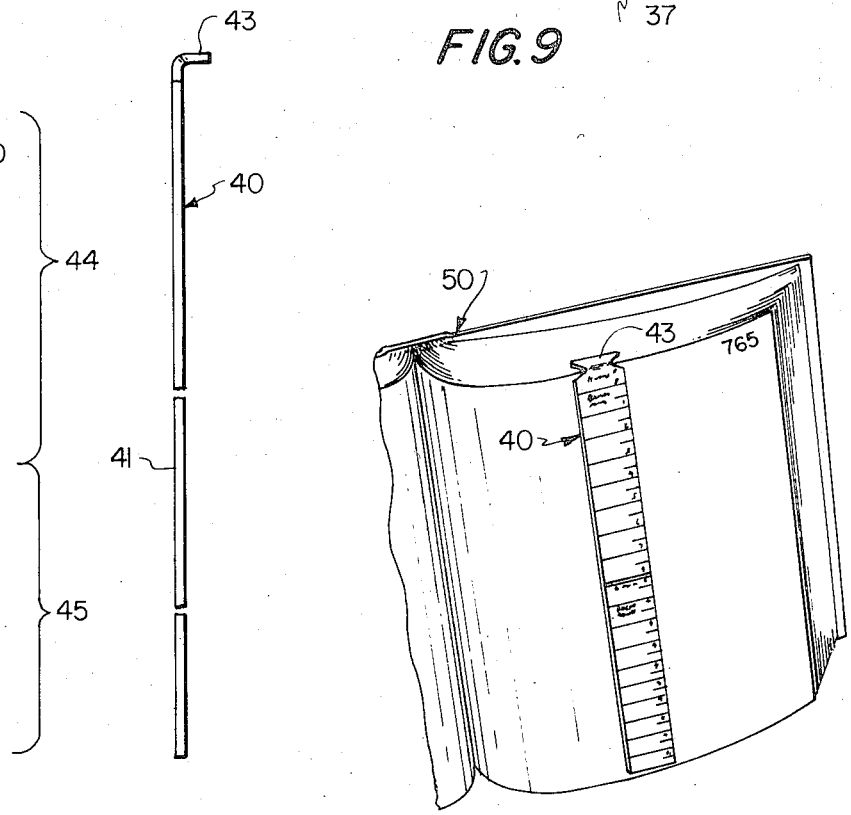
FIG. 12 is an illustration of a dictionary having a guide in proper position for use therewith.

These quadrant subdivisions correlate with the numbered portions indicated in column 36, FIG. 8, so that the guide can be used to more rapidly locate the exact position of the three-letter beginning of the word on the page. As illustrated in FIG. 12, the dictionary, indicated generally at 50 has been opened to page 765 for the purpose of locating the three-letter word beginning SAU which in this case is the word "sauce" which, from the index fragment 30 will appear on page 765 in quadrant c adjacent the number 3 on the margin guide. The dictionary is opened to page 765 and the margin guide is placed with tab 43 abutting the upper edge of the page and the number 3 will then opposite the beginning of the "sau" word, the first one of which is "sauce."

Figure 9:
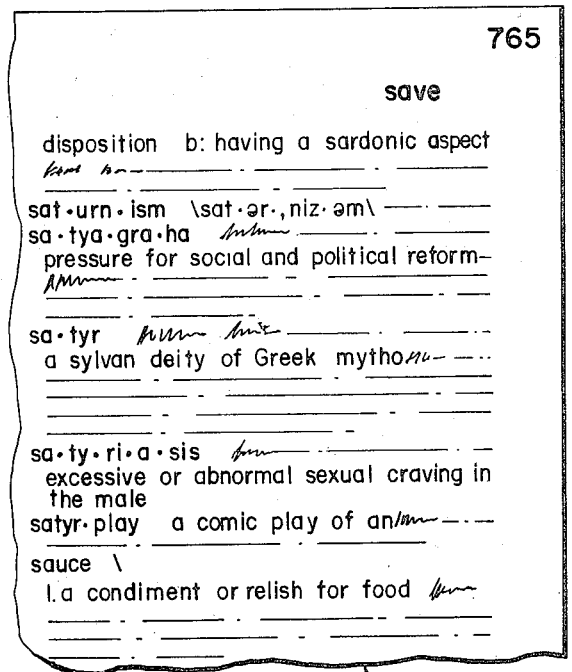
FIG. 9 is a symbolic illustration of a portion of a typical dictionary page usable with the index of FIG. 8.

It will be observed that the illustration in FIG. 9 is somewhat enlarged in comparison with the margin guide shown in FIGS. 10 and 11 so that the word "sauce" does not appear to be adjacent the number 3 on the guide. However, this is simply a matter of scale chosen for the specific illustrations.

The index concepts discussed in conjunction with FIGS. 8–12 illustrate two concepts which can be employed together but which can also be used individually, depending upon the manner in which a dictionary is indexed. For example, if the index is printed and bound in conjunction with the dictionary when the dictionary is first printed, the index can be constructed in accordance with FIGS. 1 or 8 without column 36. Under those circumstances, it would be a simple matter to include the marginal letters in the initial printing process so that, upon locating the page and quadrant on which the desired word appears one simply scans down the page until the desired third letter appears in the margin of the page.

However, if the index is added to an already printed dictionary it would be cumbersome to add the individual margin letter. Thus, when modifying an existing text, the margin guide and the additional index column would be employed these require essentially no additions to the various pages of the dictionary itself. The margin guide is therefore particularly useful in a modification kit.

A further embodiment of the index letter approach, which can be effectively incorporated when the dictionary is first printed is the "fourth letter" index illustrated at 38 in FIG. 7. This index includes a listing, at the bottom of each page, the third letters which appear on that page followed by the fourth letters which appear in conjunction with those third letters on that page. The same fourth letters are printed in the margin at the left of each column of each page, in front of the first word in which that letter appears as a fourth letter, within each three letter group.

Thus, in the example of page 87, the third letter (s), appearing in parentheses, is followed by the letters "h.m.o.q.t.u." which appear for the first time on that page, as the fourth letters in the words "bishophric, bismuth, bison, bisque, bister and bisulcate." It will also be observed that a large dot 39 is provided to distinguish between those words appearing in the left-hand and right-hand columns in the usual dictionary.

This fourth letter, bottom page index is particularly useful in conjunction with a three-letter index such as that shown in FIG. 1. The FIG. 1 index directs the user to the page on which the first use of the listed third letter appears, but that letter is sometimes used for several pages before one finds the desired fourth letter. This index fills that gap by disclosing the fourth letters at a glance.

The word "Braze," for example, is found on page 102, although the index indicates that "bra" words commence on page 100, quadrant "d." Provision of the index as shown in FIG. 7 accelerates the location of this fourth letter, Z.

While certain advantageous embodiments have been chosen to illustrate the invention, it will be understood by those skilled in the art that various changes and modifications can be made therein without departing from the scope of the invention as defined in the appended claims.

What is claimed is:

1. An index to facilitate the location of information contained in a dictionary and identified by an alphabetically arranged sequence of words on numbered pages, the index comprising
   a plurality of columnar tables, one for each one of selected letters of the alphabet, each said table including first, second, third, fourth and fifth columns,
   said first, second and third columns containing, in alphabetical order, the first three letters only of each word in the sequence of words, without unnecessary repetition of letters in the columnar direction;
   said fourth column containing the number of the page on which each three letter group begins, the number being aligned with its related group;
   said fifth column containing a symbol representing the location on the page of the beginning of the related group, the symbol being aligned with its related group and page number; and
   margin guide means having calibrations thereon for identifying locations on each page in accordance with said symbols.

2. An index according to claim 1 wherein said margin guide means comprises
   an elongated flexible strip having a lateral projection at one end for establishing alignment with a page.

3. An index according to claim 1 wherein said index includes a sixth column containing symbols identifying the quadrant of the page on which the group appears, and
   said guide means includes calibrations divided to correspond to said quadrants.

4. An index according to claim 3 and further comprising
   index means at an edge of each page for identifying the fourth letter groups which begin on that page,
   said index means being grouped and separated according to column.

5. An index according to claim 4 and including
   margin marker means including letters printed in distinctive type, as comapred with the remainder of the dictionary type, for indicating the beginnings of third letter groups, and for indicating fourth letter groups within the third letter groups.

6. An index kit for the modification of an existing dictionary in which data is sequentially arranged and is identified by a series of alphabetized words grouped by first letters, the kit comprising
   a plurality of pages;
   means on each of said pages for fastening the page into the book adjacent a word group;
   each of said pages having a multicolumn table for facilitating the rapid location of identifying words in the word group to which said page relates, said table having first, second, third, fourth, fifth and sixth columns;

said first, second and third columns containing in alphabetized order, the first three letters only of each word in the series of alphabetized words, without unnecessary repetition of letters in the columnar direction;

said fourth column containing the number of the page of the book on which each three-letter group begins, the number being aligned with its related group;

said fifth column containing a symbol representing an area on the page in which can be found the beginning of the related three-letter group, the symbol being aligned with its related group and page number; and said sixth column containing symbols indicating a location subdivision within said area;

said kit further comprising guide means calibrated to indicate the position on the page of the symbols in said sixth column.

7. An index kit according to claim 6 wherein each of said pages includes a multicolumn table for a word group beginning with one letter on one side and a table for a word group beginning with a different letter on the other side.

8. An index kit according to claim 6 wherein said guide means includes a relatively long, narrow strip bearing calibrations; and stop means for cooperating with the page edges for properly aligning said calibrations with words on the page.

* * * * *

UNITED STATES PATENT OFFICE
CERTIFICATE OF CORRECTION

Patent No. 3,820,824        Dated  June 28, 1974

Inventor(s) James F. Maxwell

It is certified that error appears in the above-identified patent and that said Letters Patent are hereby corrected as shown below:

In the drawings, Sheet 1, Fig. 7, the four triangular marks 20 should be replaced by the letters --w--, --y--, --z--, and --a--, respectively, reading top to bottom, and those letters should be identified by the reference numeral 20.

Also in Fig. 7, the bottom margin of the page depicted therein should be wider and extended to the left, and should include an index strip which appears as follows:

87    (s)h.m.o.q.t.u (t)a.c.i.s.t u (v)a.o (w)e (y)e (z)a.o (a)b.c

Signed and sealed this 3rd day of December 1974.

(SEAL)
Attest:

McCOY M. GIBSON JR.
Attesting Officer

C. MARSHALL DANN
Commissioner of Patents